(12) United States Patent
Cazenave

(10) Patent No.: US 6,474,597 B1
(45) Date of Patent: Nov. 5, 2002

(54) GAS TURBINE ENGINE MOUNTING ARRANGEMENT

(75) Inventor: Olivier J-F Cazenave, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/711,538

(22) Filed: Nov. 14, 2000

(30) Foreign Application Priority Data

Nov. 20, 1999 (GB) .............................................. 9927425

(51) Int. Cl.[7] .............................................. B64D 27/00
(52) U.S. Cl. ......................................... 244/54; 248/554
(58) Field of Search .................... 244/54, 55; 60/39.31; 248/554, 555, 556, 557

(56) References Cited

U.S. PATENT DOCUMENTS

| 4,065,077 A | 12/1977 | Brooks |
| 4,603,821 A | 8/1986 | White |
| 5,320,307 A | 6/1994 | Spofford et al. |
| 5,649,417 A | 7/1997 | Hey |
| 5,871,176 A | 2/1999 | Demouzon |
| 5,871,177 A | 2/1999 | Demouzon |
| 6,059,227 A | 5/2000 | Le Blaye et al. |

FOREIGN PATENT DOCUMENTS

| EP | 0 431 800 A | 6/1991 |
| EP | 0 879 759 A | 11/1998 |
| FR | 2755944 | 5/1998 |
| GB | 2 224 707 A | 5/1990 |
| WO | PCT/FR98/02371 A | 5/1999 |

Primary Examiner—Charles T. Jordan
Assistant Examiner—Tien Dinh
(74) Attorney, Agent, or Firm—W. Warren Taltavull; Manelli Denison & Seltzer PLLC

(57) ABSTRACT

A gas turbine engine mounting arrangement (22) for attaching a gas turbine engine (10) to an aircraft via a pylon (18). The arrangement (22) comprising a main mounting means (23) which carries the engine loads under normal operating conditions, and an auxiliary mounting structure (25). The auxiliary mounting structure. (25) comprises a safety bracket (44), and auxiliary interconnection means (29) are arranged to connect the bracket (44) to the engine (10) independently of the main mounting means (23) and so that the auxiliary mounting structure (25) is substantially unloaded under normal operating conditions. The auxiliary interconnection means (29) and the safety bracket (44) engaging with the engine (10) and carrying substantial engine loads in the event of failure of the main mounting means (23). Preferably the safety bracket (44) is interposed and sandwiched between a main bracket (2), forming part of the main mounting structure (23), and the main bracket (2) and the pylon (18).

19 Claims, 4 Drawing Sheets

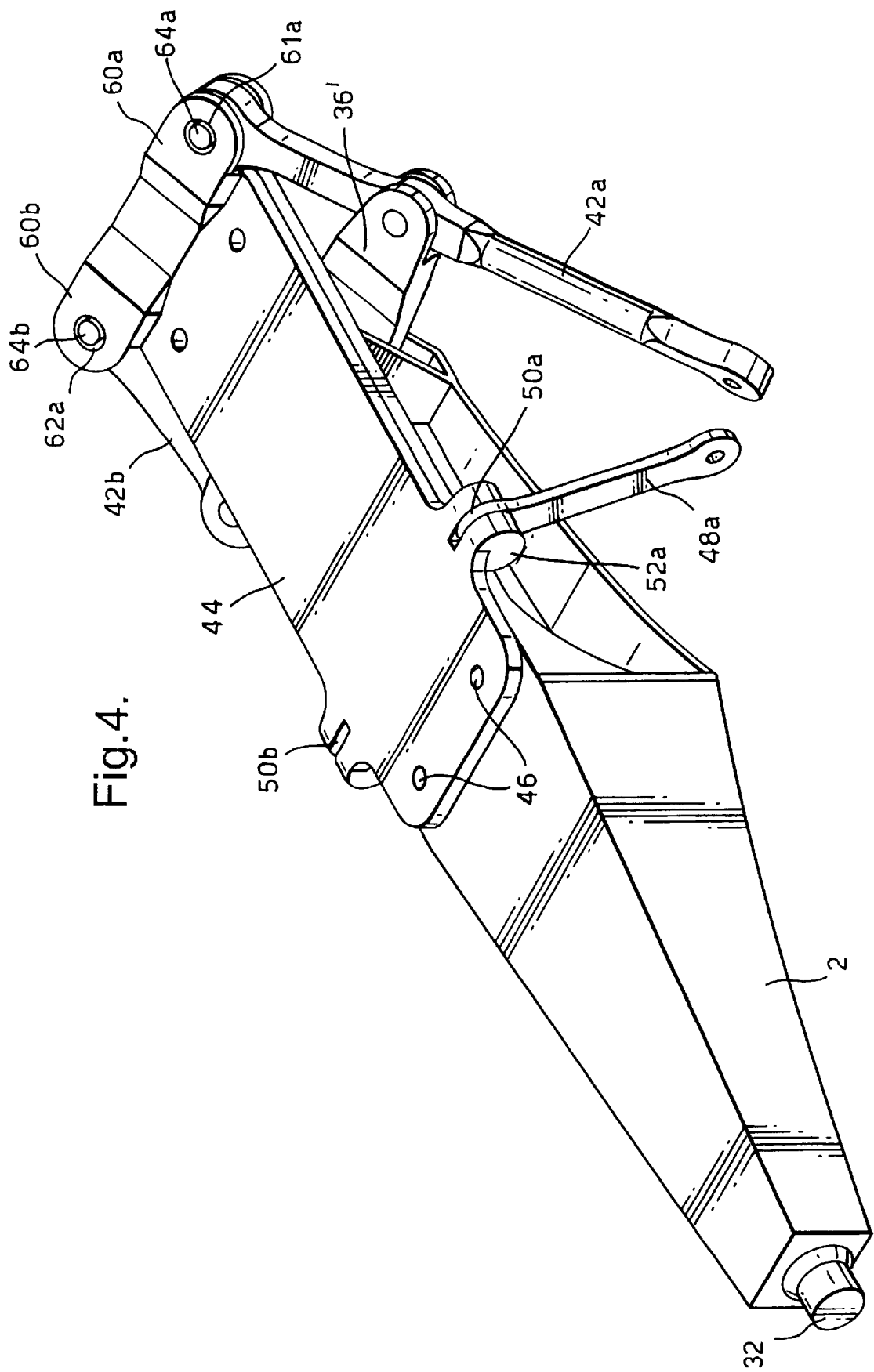

GAS TURBINE ENGINE MOUNTING ARRANGEMENT

FIELD OF THE INVENTION

The present invention relates to a mounting arrangement for mounting and attaching a gas turbine engine to an aircraft pylon structure and aircraft.

BACKGROUND OF THE INVENTION

Ducted fan gas turbine engines for powering an aircraft are mounted upon and suspended from the aircraft via a pylon structure. The pylon extends from the aircraft wing and a mounting arrangement interconnects the engine to the pylon and so to the aircraft. Once conventional type of mounting arrangement is the so-called core mount, where the pylon extends through the engine nacelle, across the by-pass duct towards the core engine casing. The mounting arrangement then interconnects the core engine casing, and so core engine, to the pylon. Generally both a front or forward mounting in the region of the compressor section of the core engine and a rear mounting in the region of the turbine section of the engine are used to connect the core engine to the pylon at two axially separated locations. The fan casing and nacelle may either be independently connected to the pylon or, more typically are supported from and by the core engine casing and core engine mountings.

The mountings are required to carry and transmit all of the operating loads of the engine including side, vertical axial (thrust) and torque loads.

One current design of core mounting arrangement for attaching the core engine to the pylon comprises an axially extending mounting bracket or beam assembly which is securely bolted to and extends axially from the pylon. The use of an axially extending bracket means that the core engine connection can be axially spaced from the pylon position and permits the axial positions of the front and rear engine mountings from the pylon to be further apart, reducing the bending moment on the engine. The use of such a bracket extending forward is preferable to extending the pylon structure itself further forward. This is because extending the pylon would make assembly and integration of the pylon with the engine problematic. It also has an adverse aerodynamic effect on the airflow through the fan duct. A pin or ball joint extends from the forward end of the mounting beam and engages within a hole in a bracket or boss which is connected to or internal with the core engine casing. The pin transmits and carries the vertical and side loads of the engine and provides the main support of the engine from the pylon and aircraft. At the rear of the mounting beam is a balance beam which extends circumferentially and is connected to mounting beam at the mid point of the balance beam. Either end of the balance beam is connected to thrust links which extend forward and connect to points on either side of the core engine casing. The thrust links and balance beam take the axial loads of the engine, with the loads from each side being balanced by pivoting of the balance beam.

Such an arrangement adequately carries the engine loads under normal operation. However in the unlikely event that the bracket, balance beam or one of the thrust links fails the mounting is no longer able to carry the required engine loads.

In order to overcome this and provide built in redundancy the bracket may be split into two symmetrical left and right halves, referred to as split brackets. Each of the split brackets is arranged to be capable of carrying all of the side and vertical engine loads so that the loads can be carried in the unlikely event of one of the split bracket failing.

In other mounting arrangements it has also been proposed to provide additional links and connections between the pylon and core engine than are strictly required to support the engine in normal use. The idea is to provide a mounting with built in redundancy so that if one link or connection should fail then the loads would be carried by the other links.

A problem with the above arrangement and the split bracket arrangement however is that all of the links and connections, and both of the split brackets are subject to the engine operating loads under normal operation. Consequently they will have all experienced similar stresses and fatigue. It is therefore likely that if one link, split bracket or connection fails then the other links or split bracket may similarly fail. This is even more likely since the other links, split bracket and connections will be carrying an increased load to compensate for the failed link or connection.

SUMMARY OF THE INVENTION

It is therefore desirable to provide an improved gas turbine engine mounting arrangement which has improved failure tolerance and/or which offers improvements generally.

According to the present invention there is provided a gas turbine engine mounting arrangement for attaching a gas turbine engine to an aircraft via a pylon, the arrangement comprising a main mounting means and an auxiliary mounting structure, the main mounting means interconnects the engine with the pylon and carries the engine loads under normal operating conditions, and an auxiliary mounting structure is capable of interconnecting the engine with the pylon and is arranged to be substantially unloaded under normal operating conditions; wherein the auxiliary mounting means comprises a safety bracket and an auxiliary interconnecting means, the safety bracket is independent of the main mounting means and is attached to the pylon, auxiliary interconnection means extends from the safety bracket to connect the safety bracket to the engine, the auxiliary interconnection means and the safety bracket only engaging with the engine and carrying substantial engine loads in the event of failure of the main mounting means.

Preferably the main mounting arrangement comprises a main bracket and a main interconnecting means, the main bracket attached to and extending in an axial direction of the engine from the pylon, and the main interconnection means attached to the main bracket to interconnect the main bracket with the engine. Furthermore one of the main interconnection means extending from the main bracket to interconnect with the engine preferably comprises a pin and corresponding socket, the pin engages the socket.

Preferably in one of the main interconnection means extending from the main bracket to interconnect with the engine comprises at least one thrust link, one end of the thrust link is attached to the main bracket with the opposite end of the thrust link attached to the engine, the thrust link extending between and connecting the main bracket and the engine. The auxiliary interconnection means extending from the safety bracket may comprise at least one ear, the at least one ear is connected to the at least one thrust link in order to connect the safety bracket with the engine, the ear connected to the thrust link so that it will only engage with the thrust link in the event of failure of the main mounting. Preferably there is a pair of thrust links, the pair of thrust links is laterally oppositely disposed about and attached to the main bracket. There is a pair of ears, the ears extending from laterally separated points of the safety bracket.

Preferably the safety bracket is interposed and sandwiched between the main bracket and the pylon. The arrangement comprises at least one mounting fastener, the at least one mounting fastener attaches the main bracket to the pylon may also attach the safety bracket to the pylon. Alternatively the safety bracket is attached to and mounted to the pylon independently of the main bracket.

The safety bracket preferably comprises a generally planar member, the generally planar member is attached to the pylon, with the auxiliary interconnection means which extend from the safety bracket connected to mounting points formed on the safety bracket.

Preferably the arrangement comprises a pin and a clearance hole, each of the auxiliary interconnection means which interconnect the safety bracket and the core engine, the safety bracket and engine via a pin mounted within a corresponding clearance hole.

The auxiliary interconnection means extending from the safety bracket may comprise at least one safety link which is pivotally attached to the safety bracket. There may be a pair of safety links. The pair of safety links may be laterally oppositely disposed on and attached to the safety bracket.

Preferably the mounting arrangement comprises a front mount attaching to and connecting a generally forward portion of the engine to the pylon. Furthermore the mounting arrangement preferably connects and attaches to a core engine of a ducted fan gas turbine engine.

According to a second aspect of the present invention there is provided a gas turbine engine mounting arrangement for attaching a gas turbine engine to an aircraft via a pylon, the arrangement comprising a main mounting means and an auxiliary mounting structure, the main mounting means interconnects the engine to the pylon and carries the engine loads under normal operating conditions, and the auxiliary mounting structure is capable of interconnecting the engine with the pylon and is arranged to be substantially unloaded under normal operating conditions; wherein the main mounting means comprises a main bracket, a pair of thrust links, a pin and a corresponding socket, the pair of thrust links disposed laterally on either side of the main bracket, the pin and corresponding socket within which the pin is engaged, is disposed at a distil end of the main bracket, the pin and socket and the thrust links interconnecting the main bracket to the engine, the auxiliary mounting means comprises an independent safety bracket, a pair of safety links, and pair of ears extending from the safety bracket, the safety bracket is connected to the pylon and is disposed between the main bracket and the pylon, the safety links extend between the safety bracket and engine and are pivotally connected to the safety bracket and engine, and the ears are connected to the respective thrust link, the connections between the ears and thrust link and the safety link connections are arranged to connect the engine to the safety bracket via a pin mounted within a clearance hole so that the safety bracket only engages with the engine and carries substantial engine loads in the event of failure of the main mounting means.

According to either aspect of the invention the auxiliary interconnection means and the safety bracket may be arranged in use to engage with the engine and carry partial engine loads in conjunction with the main mounting means under high engine load conditions.

BRIEF DESCRIPTION OF THE DRAWINGS

The present invention will now be described, by way of example only, with reference to the following figures in which:

FIG. 4 is a perspective view of similar to that of FIG. 3 but of an alternative embodiment of the mounting arrangement.

DESCRIPTION OF THE INVENTION

Figure 1:
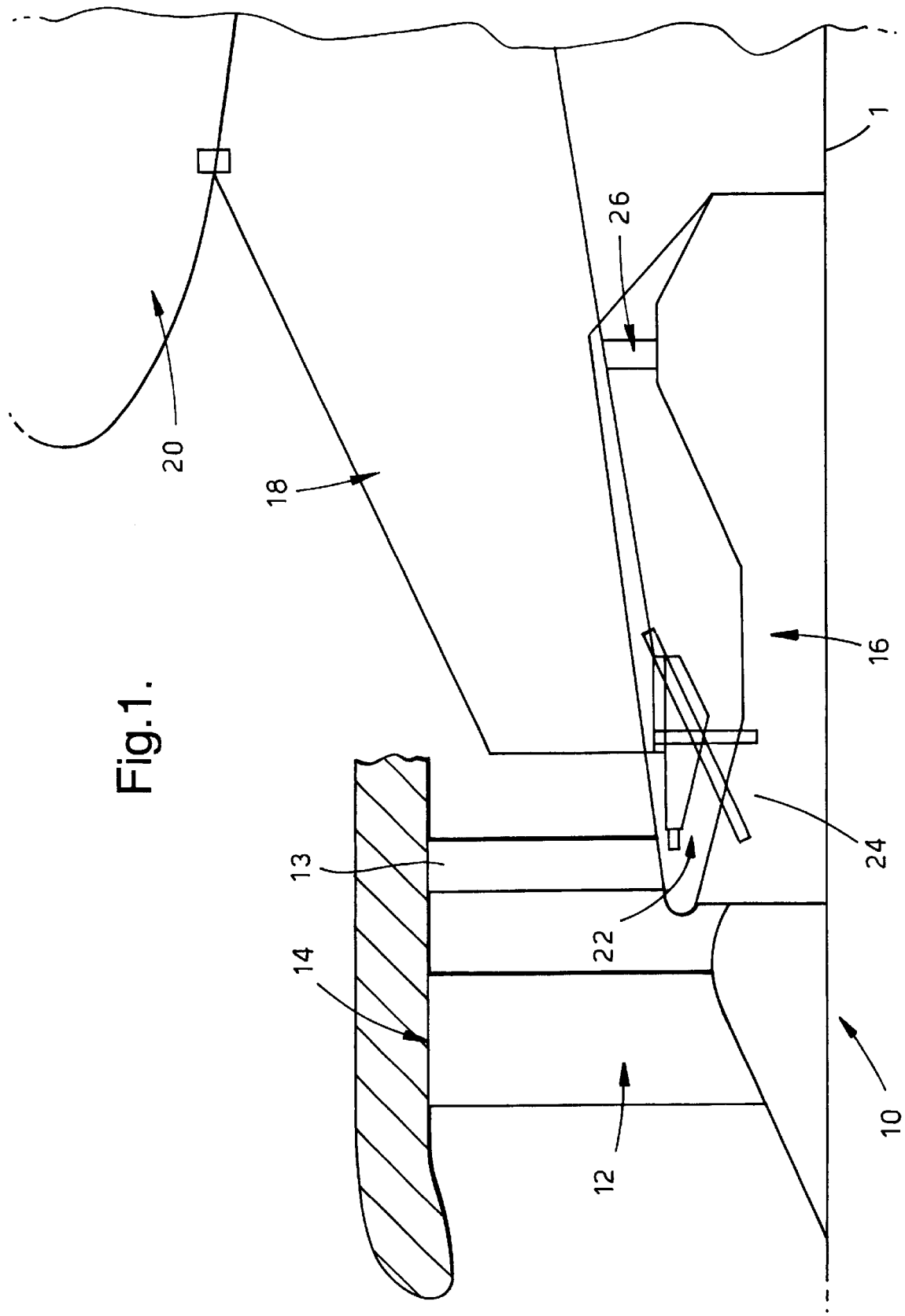
FIG. 1 is a diagrammatic cross sectional view of part of a ducted fan gas turbine engine and mounting arrangement according to the present invention.

Referring to FIG. 1. A ducted fan gas turbine engine includes a ducted fan 12. The duct is defined by a cowl 14 and the fan 12 is driven by a core engine 16. The ducted fan gas turbine engine 10 and core engine 16 are generally annular with the engine 10 having a central engine axis 1 about which parts of the engine rotate.

A pylon 18 is affixed to aircraft wing 20. The forward end of the pylon 18 has a front mounting structure 22 by means of which it is connected to a compressor casing 24 of the core engine 16. It should be understood that the term forward and rearward used throughout this description are used in relation to the general direction of flow of gases through the engine 10 shown by arrow A. A rear mounting structure 26 supports and connects the core engine 16 to an intermediate portion of the pylon 18 and supports the rear of the core engine 16. As such the mounting arrangement 22, 26 and ducted fan gas turbine engine 10 are generally conventional and known in the art. The fan casing engine cowl 14 and engine nacelle are supported from and attached to the core engine 16 via an annular array of vanes which extend between the engine cowl 14, fan casing and core engine 16.

Figure 2:
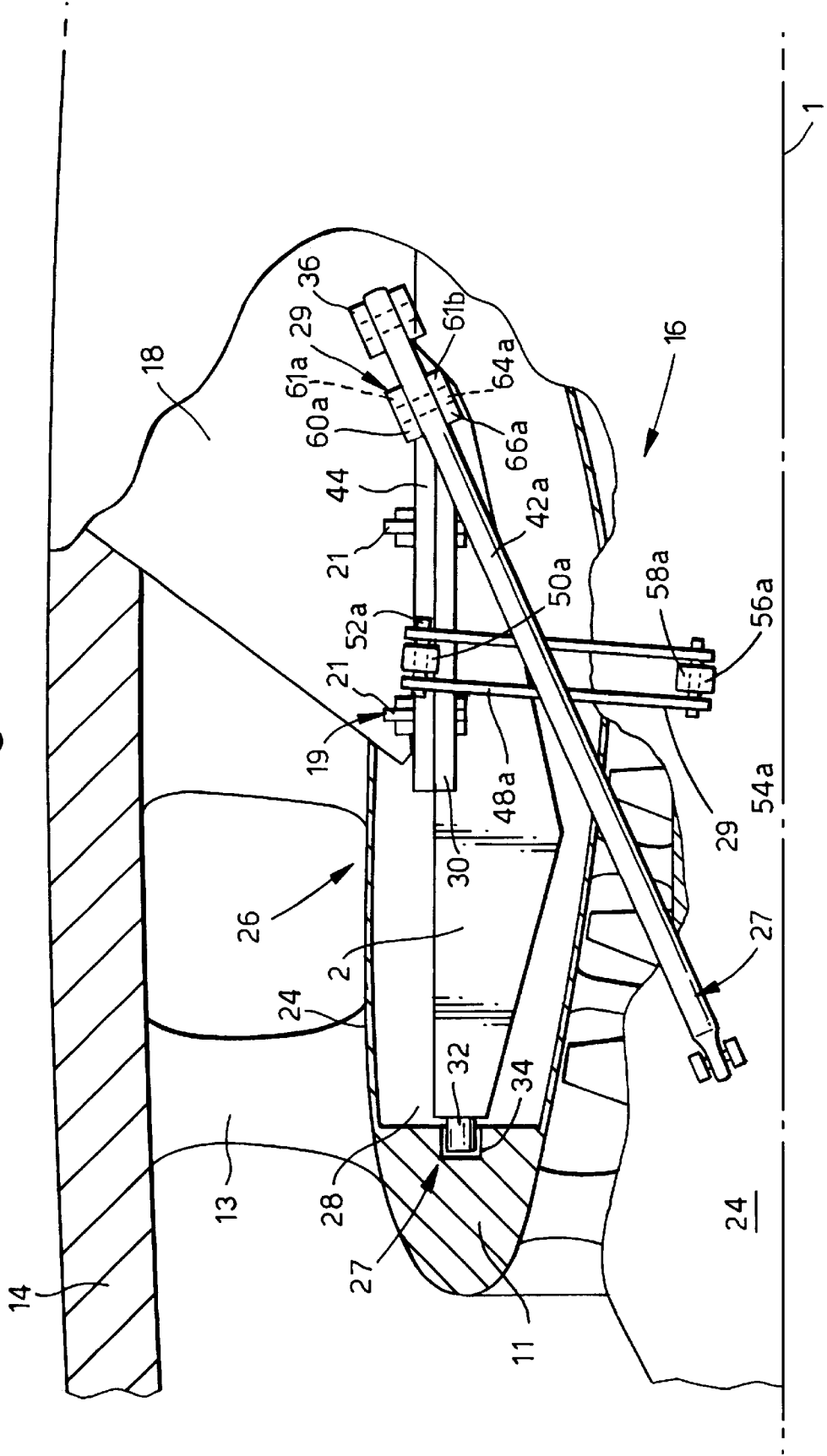
FIG. 2 is an enlarged cutaway cross sectional view of the mounting arrangement shown in FIG. 1.
Figure 3:
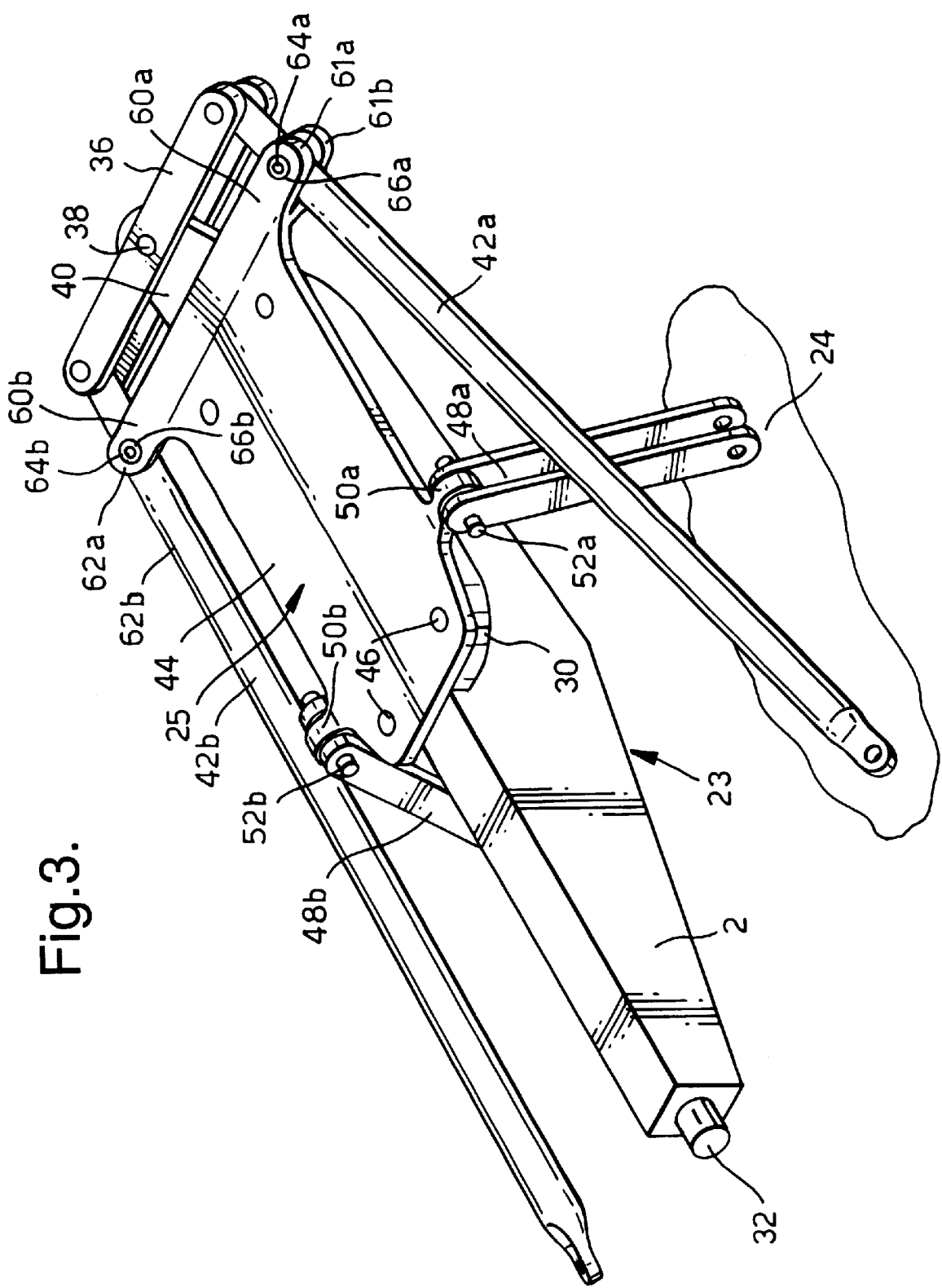
FIG. 3 is a perspective view of just the mounting structure of the mounting arrangement shown in FIG. 2 with the other components omitted for clarity.

The front mounting structure 22 is shown in more detail in FIGS. 2 and 3. FIG. 3 shows the front mounting structure 22 alone with the remainder of the engine 10 and pylon 18 omitted in the interest of clarity. The pylon 18 extends through the engine cowl 14 towards the core engine 16. The front mounting structure 22 is attached to the forward distil end of the pylon 18. The front mounting structure 22 comprises a main bracket 2 which extends forward of the pylon 18 within a core engine cowl structure 28. Mounting fasteners 19, which may be in the form of mounting bolts 21 which pass through and engage a mounting flange 30 of the main bracket 2, attach and connect the main bracket 2 to a forward portion of the distil end of the pylon 18. Those skilled in the art will may easily utilise other forms of mounting fasteners 19 which perform the same function as the mounting bolts 21. At the forward distil end of the main bracket 2 there is a cylindrical engine main mounting pin 32. This mounting pin 32 is engaged within a co-operating socket 34 within a structural support member 11 of the core engine cowl structure 28 thereby connecting the core engine 16 to the main bracket 2, pylon 18 and aircraft, and in operation carrying the engine 10 side and vertical loads.

A thrust balance beam 36, which extends laterally in a transverse direction generally perpendicular to an axis of the main bracket 2, is connected to the rearward end of the main bracket 2. A balance beam pin 38 through the central mid point of the thrust balance beam 36 pivotally connects the balance beam 36 to a flange 40 at the rear end of the main bracket 2, at the opposite end of the main bracket 2 to the mounting pin 32. The flange 40 includes a co-operating mounting hole (not shown) within which the balance beam pin 38 is accepted and engaged. A pair of thrust links 42a,42b are pivotally connected at their ends to respective opposite lateral ends of the thrust balance beam 36. The thrust links 42a,42b extend from the balance beam 36 in a forward direction with the forward end of the thrust links 42a,42b pivotally connected to the engine compressor casing 24 on opposite lateral respective sides of the core engine 16 and main bracket 2. In operation the thrust links 42a,42b carry and transmit axial thrust loads generated by the engine 10 to the main bracket 2 via the balance beam 36 and so to the pylon 18 and aircraft. The thrust balance beam 36, its pivotal mounting and the symmetrical arrangement of the thrust links 42a,42b, corrects any discrepancy in the thrust loads between the two thrust links 42a,42b. The thrust links 42a,42b and pin 32 with corresponding socket 34 comprise main interconnection means 27.

The engine mounting pin 32, main bracket 2 and thrust links 42a,42b connected to the main bracket 2 provide a suitable main mounting 23 arrangement to carry and transmit the engine side, vertical and thrust loads to the pylon 18 under normal engine operation. The rear mount structure 26 which comprises a conventional link arrangement provides a vertical and side support of the rear of the engine 10 in order to prevent the engine 10 pivoting and bending about the front mounting structure 22. The engine 10 is thereby securely mounted to and on the aircraft.

Interposed between the main bracket 2 and the pylon 18 there is a safety bracket 44 comprising a plate member mounted on top of the mounting flange 30 of the main bracket 2. The mounting bolts 21 which attach the main bracket 2 to the pylon 18 pass through holes 46 in the safety bracket 44 and also mount and attach the safety bracket 44 to the pylon 18 with the safety bracket 44 being sandwiched between the main bracket 2/main bracket flange 30 and a pylon pad (not shown) and pylon 18. Alternatively separate safety bracket bolts could be used to attach and secure the safety bracket 44 independently to the pylon 18.

Towards the forward end of safety bracket 44 there are two pairs of safety links 48a,48b. Lugs 50a,50b extend from opposite transverse sides of the safety bracket 44 towards the forward end of the safety bracket 44. One respective end of each pair of safety links 48a,48b is pivotally attached and connected at and to each of the respective lugs 50a,50b via pins 52a,52b. The other respective end of each pair of safety links 48a,48b is connected to the engine compressor casing 24 via a pin 54a,54b mounted within a clearance hole 56a,56b within a mounting a lug 58a,58b on the engine compressor casing 24. A clearance hole is a hole or aperture which has a bore diameter greater than the outer diameter of a portion of the corresponding pin which is arranged to be engaged within it, so that when the pin is coaxially disposed within the clearance hole there is a clearance or annular gap between the pin and hole bore. The pin within the clearance hole only engages the clearance hole following relative movement of the pin and clearance hole such that they are no longer disposed coaxially.

Toward the rear end of the safety bracket 44 a pair of ears 60a,60b extend from either transverse side of the safety bracket 44. The ears 60a,60b comprise an upper 61a,62a and lower 61b,62b sections which extend transversely and circumferentially from the safety bracket 44 and enclose the respective thrust links 42a,42b, with the thrust links 42a,42b disposed between the respective upper 61a,62a and lower 61b,62b sections. An auxiliary interconnecting means 29 comprises the safety links 48a,48b and ears 60a, 60b.

Pins 64a,64b pass through clearance holes 66a,66b in the upper 61a,62a and lower 61b,61b sections of the ears 60a,60b and are engaged within a corresponding hole part way along the thrust links 41a,42b.

In normal operation the engine mounting pin 32, main bracket 2 and thrust links 42a,42b connected to the main bracket 2 provide a suitable mounting arrangement to carry and transmit the engine side, vertical and thrust loads under normal engine operation to the pylon 18. The safety links 48a,48b, safety bracket 44 and connections at the ears 60a,60b of the safety bracket 44 carry no loads due to the clearance holes 56a,56b,66a,66b provided. The pins within the clearance holes 56a,56b,66a,66b do not engage the holes 56a,56b,66a,66b under normal operation with the engine 10 held by the main connection means. Consequently the safety links 48a,48b, safety bracket 44 and connections at the ears 60a,60b of the safety bracket 44 are unstressed during normal operation and are not subject to any fatigue loading.

In the unlikely, and rare event, of failure of the main engine pin 32 and/or main bracket 2 or other failure within the main engine mounting side and vertical load path, however the engine 10 will drop slightly. In this case the safety link pins 54a,54b mounted within the clearance holes 56a,56b will become engaged within the clearance holes 56a,56b and the safety links 48a,48b will be engaged and will carry the engine side and vertical loads transmitting them through the safety bracket 44 to the pylon 18 and aircraft. In a similar way in the unlikely event of failure in the axial load path, for example failure of the thrust balance beam 36, its mounting to the main bracket 2, failure of the main bracket 2 and/or failure of one of the thrust links 42a,42b then the pins 64a,64b within the safety bracket ears 60a,60b will become engaged within, and be caught by, the clearance holes 66a,66b and thrust loads will be carried and transmitted by the ears 60a,60b of the safety bracket 44, and safety bracket 44 to the pylon 18 and aircraft. In the situation where a thrust link 42a/42b fails then the thrust loads are carried by the remaining thrust link 42b/42a and safety bracket ear 60a,60b with the balance beam 36 pivoting slightly.

The safety bracket 44, safety links 48a,48b and ears 60a,60b attached to the safety bracket 44 thereby provide an auxiliary load path for the engine loads to ensure that the engine 10 is supported and loads transmitted to the pylon 18 in the event of failure of the main mounting 23 means (engine pin 32, main bracket 2, thrust links 42a,42b, and balance beam 36). Accordingly the mounting arrangement 22 described and shown provides an improved 'fail-safe' or auxiliary mounting 25 arrangement. A particular advantage of this front mounting 22 arrangement is that since the safety bracket 44, safety links 48a,48b and safety bracket ears 60a,60b are not loaded under normal conditions then they will not experience the loading damage, stress, and fatigue to which the main mountings have been subject. The safety bracket 44, links 48a,48b,and safety bracket ears 60a,60b will therefore be in an substantially 'as new' condition and the chances of them failing is therefore reduced enhancing the overall safety of the mounting arrangement 22. A further advantage is that the alternate load path provided by the safety links 48a,48b, safety bracket 44 and safety bracket ears 60a,60b is substantially independent of the main load path comprising the main engine bracket 2, mounting pin 32 and balance beam 36. Consequently the mounting arrangement 22 has built in redundancy providing enhanced safety.

In addition since the safety bracket 44 is sandwiched between the pylon 18 and main bracket 2 it is subject to a slight compressive load. This reduces the likelihood of crack generation within the safety bracket 44 so reducing the likelihood of failure of the safety bracket 44 when loaded.

A yet further advantage offered by this arrangement is that the auxiliary load path passing through the auxiliary mounting 25 (safety bracket 44, lugs 50a,50B and links 48A,48B) is closer to the pylon 18 than the main load path which extends axially forward to the pin 42. The bending moment loads and shear loads within the safety bracket 44 when loaded are therefore less than within the main bracket 2. The safety bracket 44 is therefore lighter than the redundant split bracket used conventionally and the total weight of the mounting structure 22 is less than a conventional split bracket arrangement for the same load capability and redundancy. The main bracket 2 and mounting arrangement 22 also advantageously occupies less space than the double split bracket arrangement. Alternatively for a given weight and size the use of the proposed mounting structure 22 enables (as compared to the split bracket arrangement) a longer main bracket 2 to be used and the mounting pin 32 to core engine 16 connection to be positioned in a more convenient structural location, and/or enables the front 22 and rear 26 mounting arrangement locations to be separated by a greater axial distance which provides a more stable mounting and reduces the bending moment on the mountings 22,26, pylon 18 and engine 10. Positioning the main mounting pin 32 further forward by using an extended main bracket 2, as described, enables the pin 32 to be substantially axially aligned with fan vanes 13 which support the engine cowl 14, fan casing and nacelle. This reduces any bending of the core engine 16 caused by the fan casing, engine cowl 14 and nacelle loads with these loads being transmitted to the pin 32 and main bracket 2 in substantially the same, or very nearly the same, axial plane. It being understood that bending of the core engine 16 is undesirable since this can affect the clearances between components within the core engine 16 which adversely affects the performance of the engine 10 as well as generating stresses in the core engine 16 components.

In a variation of the proposed arrangement the safety bracket 44 could be arrangement to relieve some of the loads from the main bracket 2 under extreme loading of the mounting 22. This can be done by sizing the clearance holes 56a,56b such that above a certain amount of bending of the main bracket 2 (which will occur due to loading) the pins 54a,54b become engaged. Loads causing greater bending of the main bracket 2 would then be shared between the safety bracket 44 and main bracket 2. This would then enable the main bracket 2 to be made lighter since the maximum loads on it would be reduced. Such load sharing does not however greatly affect or stress and fatigue in the safety bracket 44 since such high maximum loading of the auxiliary mounting 25 only ever occurs rarely and is not generally typical of the normal loading. The clearance holes 56a,56b being sized such that under normal loading (which is below maximum loading) the pins 54a,54b do not engage and the safety bracket 44 is not loaded.

A further embodiment and variation of the mounting arrangement 22 is shown in FIG. 4. As shown the mounting is substantially the same as that shown in FIG. 3 and like reference numerals have been used for like features. The main difference in this variation is that the axial positions of the balance beam 36 and the ears 60a,60b has been reversed with the balance beam 36' positioned and mounted at a position axially forward of the safety bracket ears 60a',60b'. The thrust links 42a,42b are also extended beyond the connection to the balance beam 36' so that they can be engaged within the safety bracket ears 60a'60b'. The main bracket 2' is also modified, in particular provided with apertures in order to accommodate the revised position in of the balance beam 36' and its mounting to the main bracket 2'.

It will be appreciated by those skilled in the art that although the invention has been described with reference to a front mounting 22, the invention could equally be applied to a rear engine mounting 26 with a more conventional front mounting or a further mounting in accordance with the invention.

It will also be appreciated that the clearance holes 56a, 56b,66a,66b which ensure that the safety links 48a,48b and connections between the safety bracket ears 60a,60b and thrust links 42a,42b are not loaded during normal operation need not be provided in the positions shown and may be provided at other connection points between the safety links 48a,48b and safety bracket 44 and between the safety bracket ears 60a,60b and thrust links 42a,42b. Furthermore other known means could be provided to ensure that the safety links 48a,48b, safety bracket 44 and safety bracket ears 60a,60b are not loaded during normal operation when the engine loads are carried by the main mountings and connections. A particularly significant feature of the invention is that an alternate separate auxiliary load path in the event of failure of the main mounting, or interconnections, is provided (by the safety links 48a,48b, safety bracket 44 and safety bracket ears 60a,60b) which is not loaded under normal operation of the mounting 22.

I claim:

1. A gas turbine engine mounting arrangement for attaching a gas turbine engine to an aircraft via a pylon, the arrangement comprising a main mounting means and an auxiliary mounting structure, wherein the main mounting means interconnects the engine with the pylon and carries the engine loads under normal operating conditions, the auxiliary mounting structure is capable of interconnecting the engine with the pylon and is arranged to be substantially unloaded under normal operating conditions;

wherein the auxiliary mounting structure comprises a safety bracket and an auxiliary interconnection means, bracket is independent of the main mounting means and is attached to the pylon, the auxiliary interconnection means comprises at least one safety link, the at least one safety link being pivotally attached to and extending from the safety bracket and extending from the safety bracket to connect the safety bracket to the engine, the auxiliary interconnection means and the safety bracket only engaging with the engine and carrying substantial engine loads in the event of failure of the main mounting means.

2. A gas turbine engine mounting arrangement as claimed in claim 1 wherein the main mounting arrangement comprises a main bracket and a main interconnection means, the main bracket attached to and extending in an axial direction of the engine from the pylon, and main interconnection means attached to the main bracket to interconnect the main bracket with the engine.

3. A gas turbine engine mounting arrangement as claimed in claim 2 wherein one of the main interconnection means extending from the main bracket to interconnect with the engine comprises a pin and a corresponding socket, the pin engages the socket.

4. A gas turbine engine mounting arrangement as claimed in claim 2 wherein one of the main interconnection means extending from the main bracket to interconnect with the engine comprises at least one thrust link, one end of the thrust link is attached to the main bracket with the opposite end of the thrust link attached to the engine, the thrust link extending between and connecting the main bracket and the engine.

5. A gas turbine engine mounting arrangement as claimed in claim 4 wherein there is a pair of thrust links, the pair of thrust links are laterally oppositely disposed about and attached to the main bracket.

6. A gas turbine engine mounting arrangement as claimed in claim 4 wherein there is a pair of ears, the pair of ears extend from laterally separated points of the safety bracket.

7. A gas turbine engine mounting arrangement as claimed in claim 2 wherein the safety bracket is interposed and sandwiched between the main bracket and the pylon.

8. A gas turbine engine mounting arrangement as claimed in claim 7 wherein the arrangement comprises at least one mounting fastener, the at least one mounting fastener attaches the main bracket to the pylon also attach the safety bracket to the pylon.

9. A gas turbine engine mounting arrangement as claimed in claim 1 wherein the safety bracket is attached to and mounted to the pylon independently of the main bracket.

10. A gas turbine engine mounting arrangement as claimed in claim 1 wherein the safety bracket comprises a generally planar member, the generally planar member is attached to the pylon, with the auxiliary interconnection means which extend from the safety bracket connected to mounting points formed on the safety bracket.

11. A gas turbine engine mounting arrangement as claimed in claim 1 wherein the arrangement comprises a pin and a clearance hole, each of the auxiliary interconnection means interconnect the safety bracket and the core engine, the safety bracket and engine via a pin mounted within a corresponding clearance hole.

12. A gas turbine engine mounting arrangement as claimed in claim 1 wherein the mounting arrangement comprises a front mount attaching to and connecting a generally forward portion of the engine to the pylon.

13. A gas turbine engine mounting arrangement as claimed in claim 1 wherein the mounting arrangement connects and attaches to a core engine of a ducted fan gas turbine engine.

14. A gas turbine engine mounting arrangement as claimed in claim 1 wherein the auxiliary interconnection means and the safety bracket are arranged in use to engage with the engine and carry partial engine loads in conjunction with the main mounting means under high engine load conditions.

15. A gas turbine engine mounting arrangement for attaching a gas turbine engine to an aircraft via a pylon, the arrangement comprising a main mounting means and an auxiliary mounting structure, wherein the main mounting means interconnects the engine with the pylon and carries the engine loads under normal operating conditions, the auxiliary mounting structure is capable of interconnecting the engine with the pylon and is arranged to be substantially unloaded under normal operating conditions;

wherein the auxiliary mounting structure comprises a safety bracket and an auxiliary interconnection means, bracket is independent of the main mounting means and is attached to the pylon, the auxiliary interconnection means comprises at least one safety link, the at least one safety link being pivotally attached to and extending from the safety bracket and extends from the safety bracket to connect the safety bracket to the engine, the auxiliary interconnection means and the safety bracket only engaging with the engine and carrying substantial engine loads in the event of failure of the main mounting means;

the main mounting arrangement comprising a main bracket and a main interconnection means, the main bracket being attached to and extending in an axial direction of the engine from the pylon, and main interconnection means attached to the main bracket to interconnect the main bracket with the engine, one of the main interconnection means extending from the main bracket to interconnect with the engine comprising at least one thrust link, one end of the thrust link being attached to the main bracket with the opposite end of the thrust link attached to the engine, the thrust link extending between and connecting the main bracket and the engine;

wherein the auxiliary interconnection means extending from the safety bracket comprise at least one ear, the at least one the ear is connected to the at least one thrust link in order to connect the safety bracket with the engine, the ear connected to the thrust link so that it will only engage with the thrust link in the event of failure of the main mounting.

16. A gas turbine engine mounting arrangement for attaching a gas turbine engine to an aircraft via a pylon, the arrangement comprising a main mounting means and an auxiliary mounting structure, wherein the main mounting means interconnects the engine to the pylon and carries the engine loads under normal operating conditions, the auxiliary mounting structure is capable of interconnecting the engine with the pylon and is arranged to be substantially unloaded under normal operating conditions;

wherein the main mounting means comprises a main bracket, a pair of thrust links, a pin and corresponding socket, the pair of thrust links disposed laterally on either side of the main bracket, the pin and corresponding socket within which the pin is engaged, is disposed at a distil end of the main bracket, the pin and socket and the thrust links interconnecting the main bracket to the engine, the auxiliary mounting structure comprises an independent safety bracket, a pair of safety links, and pair of ears, the pair of ears extending from the safety bracket, the safety bracket is connected to the pylon and is disposed between the main bracket and the pylon, the safety links extending between the safety bracket and engine are pivotally connected to the safety bracket and engine, and the ears are connected to the respective thrust link, the connection between the ears and thrust link and the safety link connections are arranged to connect the engine to the safety bracket via a pin mounted within a clearance hole so that the safety bracket only engages with the engine and carries substantial engine loads in the event of failure of the main mounting means.

17. A gas turbine engine mounting arrangement as claimed in claim 16 wherein the auxiliary interconnection structure and the safety bracket are arranged in use to engage with the engine and carry partial engine loads in conjunction with the main mounting means under high engine load conditions.

18. A gas turbine engine in mounting arrangement for attaching a gas turbine engine to an aircraft via a pylon, the arrangement comprising a main mounting means and an auxiliary mounting structure, wherein the main mounting means interconnects the engine with the pylon and carries the engine loads under normal operating conditions, the auxiliary mounting structure is capable of interconnecting the engine with the pylon and is arranged to be substantially unloaded under normal operating conditions;

wherein the auxiliary mounting means comprises a safety bracket and an auxiliary interconnection means, bracket is independent of the main mounting means and is attached to the pylon, the auxiliary interconnection means comprises a pair of safety links, said pair of safety links being pivotally attached to and extending from the safety bracket and extending from the safety bracket to connect the safety bracket to the engine, the auxiliary interconnection means and the safety bracket only engaging with the engine and carrying substantial engine loads in the event of failure of the main mounting means.

19. A gas turbine engine in mounting arrangement for attaching a gas turbine engine to an aircraft via a pylon, the arrangement comprising a main mounting means and an auxiliary mounting structure, wherein the main mounting means interconnects the engine with the pylon and carries the engine loads under normal operating conditions, the auxiliary mounting structure is capable of interconnecting the engine with the pylon and is arranged to be substantially unloaded under normal operating conditions; wherein the auxiliary mounting means comprises a safety bracket and an auxiliary interconnection means, bracket is independent of the main mounting means and is attached to the pylon, the auxiliary interconnection means comprises a pair of safety links, said pair of safety links being pivotally attached to and extending from the safety bracket and extending from the safety bracket to connect the safety bracket to the engine, the auxiliary interconnection means and the safety bracket only engaging with the engine and carrying substantial engine loads in the event of failure of the main mounting means, said pair of safety links being laterally oppositely disposed on and attached to the safety bracket.

* * * * *